US006234732B1

(12) United States Patent
Trippensee et al.

(10) Patent No.: US 6,234,732 B1
(45) Date of Patent: May 22, 2001

(54) TIE DOWN LOOP FOR MOTORIZED WHEELCHAIR

(75) Inventors: Darin J. Trippensee, Boulder, CO (US); Paul C. Dickie, Clovis, CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/192,090

(22) Filed: Nov. 13, 1998

(51) Int. Cl.[7] ....... B60P 3/079

(52) U.S. Cl. ....... 410/7; 410/11; 410/23; 180/907

(58) Field of Search ....... 180/907, 65.1, 180/65.6; 280/650, 657, 658, 647, 47.38, 47.4, 47.41; 297/DIG. 4, 482, 485, 463.1; 248/503.1, 499, 503, 505, 506; 410/3, 4, 7, 10, 11, 23, 66; 296/65.04

(56) References Cited

U.S. PATENT DOCUMENTS

| | | | | |
|---|---|---|---|---|
| 2,948,253 | * | 8/1960 | Coonrod | 115/17 |
| 4,103,934 | * | 8/1978 | Arnholt et al. | 280/744 |
| 4,147,318 | * | 4/1979 | McDonald | 180/64 |
| 4,257,644 | * | 3/1981 | Stephens | 296/65 |
| 4,389,056 | * | 6/1983 | Tenniswood | 280/289 |
| 4,427,210 | * | 1/1984 | Wevers | 280/289 |
| 4,455,046 | * | 6/1984 | Linderoth | 296/65 |
| 4,492,403 | * | 1/1985 | Blomgren et al. | 296/65 |
| 4,688,843 | * | 8/1987 | Hall | 296/65 |
| 4,690,364 | * | 9/1987 | Constantin | 248/503.1 |
| 4,826,193 | * | 5/1989 | Davis | 280/304.1 |
| 4,934,722 | * | 6/1990 | Goetzelman | 280/250.1 |
| 4,973,022 | * | 11/1990 | Mayland | 248/503.1 |
| 5,026,225 | * | 6/1991 | McIntyre | 410/23 |
| 5,044,847 | * | 9/1991 | Saunders et al. | 410/101 |
| 5,186,269 | * | 2/1993 | Avakian et al. | 180/6.5 |
| 5,391,030 | * | 2/1995 | Lee | 410/12 |
| 5,431,524 | * | 7/1995 | Antal et al. | 414/537 |
| 5,823,723 | * | 10/1998 | Finch | 410/22 |
| 5,888,038 | * | 3/1999 | Ditch et al. | 410/7 |
| 5,944,131 | * | 8/1999 | Schaffner et al. | 180/65.1 |

OTHER PUBLICATIONS

ANSI/RESNA WC/19 Standards for Wheelchairs Used as Seats in Motor Vehicles, pp. 9 and 10, published Oct. 1997.
SAE J2249 Wheelchair Tiedown and Occupant Restraint Systems for use in Motor Vehicles, p. 42, published Oct. 1996.
ISO/CD Proposed Standards 7176/ 19–1, Annex D, Specifications for Strap–Type Securement Points on Wheelchairs, p. 22, published Jule 1997.

* cited by examiner

*Primary Examiner*—J. J. Swann
*Assistant Examiner*—J. Allen Shriver
(74) *Attorney, Agent, or Firm*—MacMillan, Sobanski & Todd, LLC

(57) ABSTRACT

A wheelchair includes a base frame having a longitudinal axis, and a forward end and a rearward end joined by a first side frame and a second side frame, each side frame being generally parallel to the longitudinal axis. The wheelchair also includes a first motor and a second motor. A first mounting bracket is affixed on the first side frame and a second mounting bracket affixed on the second side frame. The first and second mounting brackets have a main body including a motor gear bore for securing the first motor or the second motor, a front tie down point directed toward the forward end of the frame, and a rear tie down point directed toward the rearward end of the frame.

7 Claims, 5 Drawing Sheets

TIE DOWN LOOP FOR MOTORIZED WHEELCHAIR

BACKGROUND OF THE INVENTION

This invention relates in general to wheelchairs and more particularly, to tie down points for wheelchairs. Most particularly, the invention relates to a tie down bracket for wheelchairs to create tie down points for securing a wheel chair in a vehicle.

Wheelchairs generally include a frame that supports a pair of drive wheels and a pair of front casters. The drive wheels and casters are typically rigidly supported by the wheelchair frame. The drive wheels make contact with the ground and are driven to propel the wheelchair. The drive wheels may be driven manually or powered by an electrical motor. The wheelchair supports a seat assembly comprising a seat and a backrest. The seat assembly is oriented above and between the drive wheels and the front casters to provide stability.

Wheel chairs are frequently transported in vehicles with the user in them. Typically, the user drives the wheelchair onto a lift attached to the vehicle. The lift is operated to raise the wheelchair into the vehicle. The user stays in the wheelchair while the vehicle is being driven. Often, the wheelchair is secured simply by setting the brakes. Perhaps some minimum kind of tie down is provided. At worst this tie down might consist of nothing more than opposing shock cords that do little more than prevent rocking of the wheelchair as the vehicle turns. At best, high-test nylon webbing is looped through any convenient location in the frame or wheels.

Tremendous forces are generated inside a vehicle every time an accident occurs. These forces are so great that it is not uncommon for individuals secured to a vehicle seat with a lap and shoulder harness to suffer injuries ranging from deep bruising to cracked ribs. Obviously, someone sitting in an unsecured or barely secured wheelchair will be severely injured. The likelihood of injury decreases if the wheelchair is secured with webbing. However, the combination of a motorized wheelchair and its user can easily weigh 500 lbs. (227 kg). In an accident, the force generated by such mass is focused at the point where the webbing passes through the frame or wheels. Considering that typical casual tie down points are not engineered to withstand such focused forces, its not surprising that wheelchairs fail to stay secured in place during vehicle accidents.

Thus is would be desirable to have tie down points through which a wheelchair could be safely and securely tied down in a vehicle.

SUMMARY OF THE INVENTION

The above objects as well as other objects not specifically enumerated are achieved by a wheelchair comprising a base frame having a longitudinal axis, and a forward end and a rearward end joined by a first side frame and a second side frame, each side frame being generally parallel to the longitudinal axis. The wheelchair also includes a first motor and a second motor. A first mounting bracket is affixed on the first side frame and a second mounting bracket affixed on the second side frame. The first and second mounting brackets have a main body including a motor gear bore for securing the first motor or the second motor, a front tie down point directed toward the forward end of the frame, and a rear tie down point directed toward the rearward end of the frame.

According to this invention there is also provided a mounting bracket for supporting a motor for a wheelchair, the mounting bracket providing front and rear tie down points. The mounting bracket comprises a main body configured, such as with a series of bores, to be attached to the wheelchair, and also comprises a bore for securing the motor. A front portion of the main body defines the front tie down point, and a rear portion of the main body defines the rear tie down point.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention is directed to a mounting bracket for supporting a motor for a wheelchair and simultaneously providing integrated front and rear tie down points for securing the wheel chair in a vehicle, aircraft, boat, etc.

Figure 1:
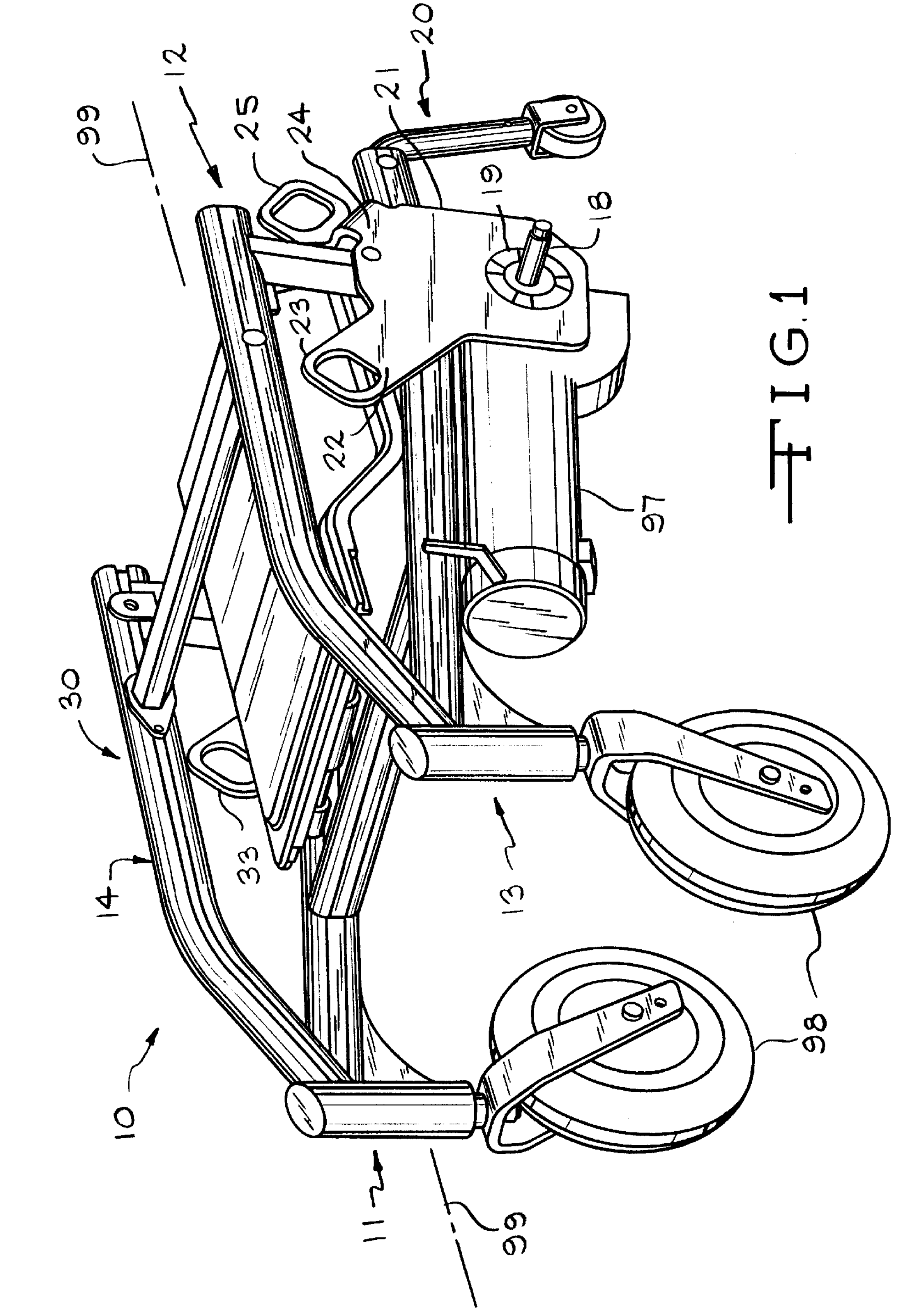
FIG. 1 is a perspective view of a base frame assembly of a wheelchair showing an embodiment of the invention.

Referring now to the drawings, there is illustrated in FIG. 1, a perspective view of a base frame assembly 10 of a wheelchair showing an embodiment of the invention. The frame 10 has a longitudinal axis, illustrated generally by the line 99 running from left to right in the Figure. The frame also has a forward section 11 (on the left side of the Figure), having a pair of front casters 98, and a rearward section 12. The rear wheels are not shown in the drawing so that the invention can be better seen. The forward end 11 and the rearward end 12 are joined by a first side frame 13 and a second side frame 14. Each side frame 13, 14 is preferably oriented in a plane, not shown, that is generally parallel to the longitudinal axis 99 approximately parallel to the horizontal axis.

A motor 97 is affixed, either directly or indirectly, to the side frame 13 of the wheelchair frame 10. A second motor (not shown) is affixed to the side frame 14 of the wheelchair base frame. The described positioning of the motor is illustrative and is in no way intended to limit the invention.

A first mounting bracket 20 is affixed to the first side frame 13 and a second mounting bracket 30 is affixed to the second side frame 14 (only a small portion of the mounting bracket 30 is visible), as shown in FIG. 1. The first mounting bracket 20 and the second mounting bracket 30 as shown are mirror images of each other. Alternatively, the first mounting bracket and the second mounting bracket may be identical or dissimilar depending on the wheelchair. While the following discussion focuses on the first mounting bracket 20, the same description also applies to the second mounting bracket 30. If the first bracket 20 and second bracket 30 were dissimilar, such dissimilarities would not affect this description.

Figure 2:
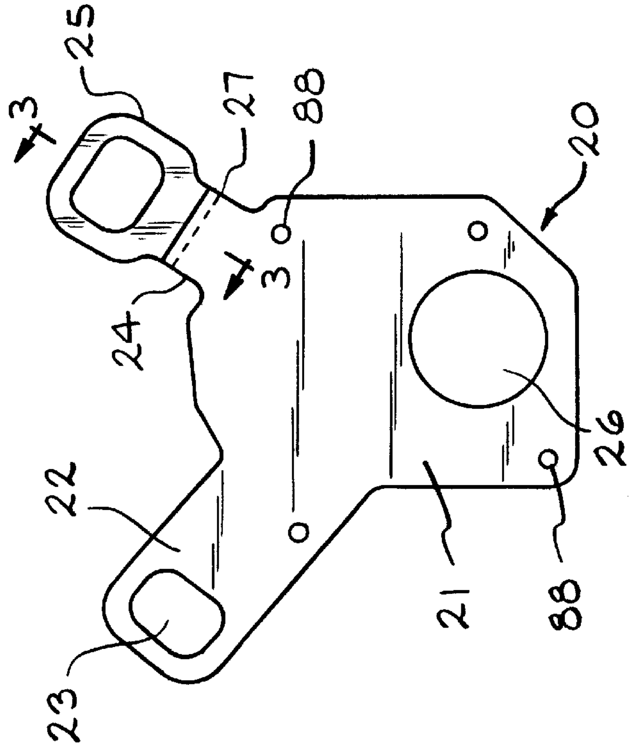
FIG. 2 is a view in elevation of an embodiment of the bracket of the invention illustrating angled front and rear tie down points with the rear tie down point positioned in a different plane from the plane of the bracket.

As shown in FIGS. 1 and 2, the first mounting bracket 20 has a main body 21 having a motor gear bore 26 for receiving the drive gear 19 for the drive wheel. The drive wheel is indicated at 71 in FIG. 10. The drive wheel is mounted for rotation on an axle 18. The motor 97 drives the drive gear 19 which rotates the drive wheel to propel the wheelchair. The axle is mounted through the bore 26 and the drive gear 19, and hence the drive wheel is indirectly mounted for rotation from the bracket 20. It is to be understood that any suitable motor and gear combination can be used. As illustrated, the motor is secured to the bracket by the mounting of the drive gear through the bracket bore 26, although the motor can be secured to the bracket in any other suitable manner.

A front tie down point 23 is positioned in a front portion 22 of the bracket. The front portion 22 is oriented toward or directed toward the front or forward end of the base frame 11. A rear tie down point 25, positioned in a rear portion 24 of the bracket 20, is directed toward the rearward end of the frame. (FIG. 1 also illustrates the front tie down point 33 of the second mounting bracket 30.) A variety of bores 88 through the main body 21 provide convenient points for affixing the mounting bracket 20 to the side frames of the wheelchair. It is to be understood that other methods of fixing the mounting bracket to the wheelchair can be used.

Figure 3:
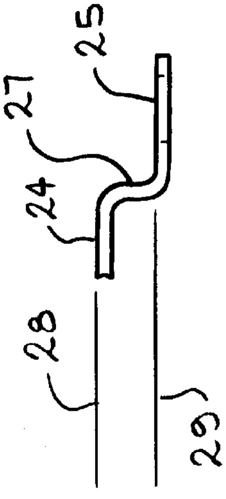
FIG. 3 is a cross-sectional view of the rear tie down point taken along line 3—3 of FIG. 2, illustrating the offset between the plane defined by the rear tie down point and the plane defined by the main body of the bracket.

The main body 21 and the front portion 22 are positioned in a first plane (indicated by line 28 in FIG. 3), and the rear tie down point 25 is positioned in a second plane (indicated by line 29 in FIG. 3) spaced apart from and generally parallel to the first plane 28. The tie down point 25 defines a second plane 29, and is attached to the first plane 28, defined by the main body 21, by a curved connector section or offset 27. This offset 27 permits the rear tie down 25 to be configured to better fit the wheelchair frame 10 and to create contact points that distribute forces from the mounting bracket 20 or 30 to the frame 10. The amount of distance between the two planes 28 and 29 is preferably within the range of from about 0.5 to about 5 cm, and more preferably within the range of from about 1 to about 3 cm, although other spacings could also be used.

Figure 4:
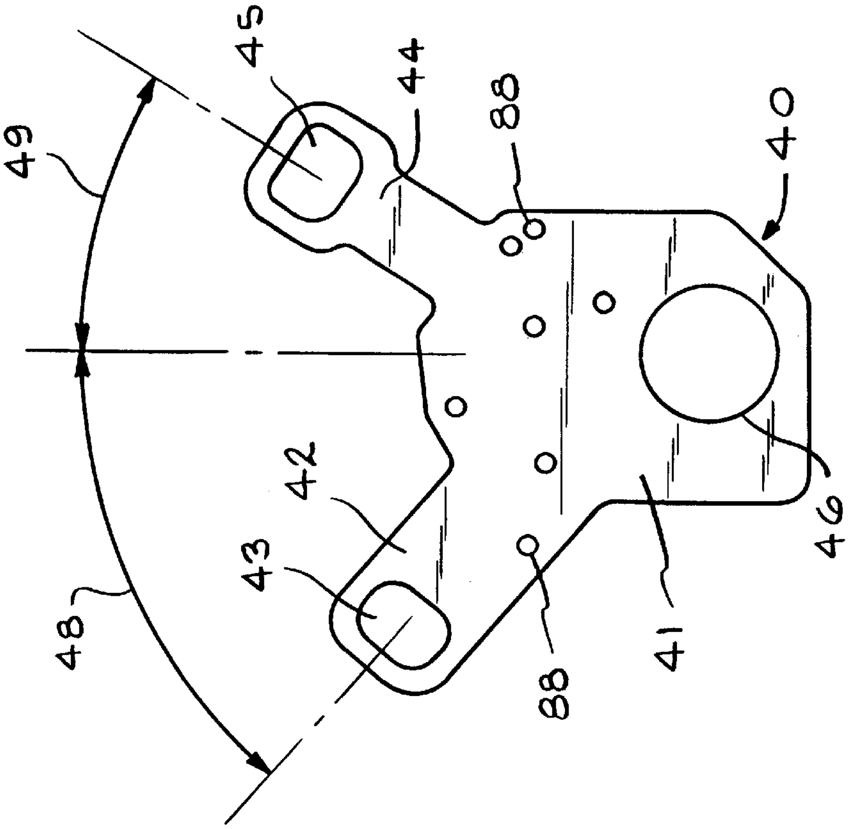
FIG. 4 is a view of an embodiment of the bracket of the invention illustrating angled front and rear tie down points, with the front tie down point, rear tie down point, and main body all positioned in the same plane.

In an alternative embodiment of the invention, as shown in FIG. 4 the various portions of the bracket can be positioned all in the same plane. As shown, this alternative mounting bracket 40 has a main body 41, and includes the motor gear bore 46. The front portion 42 includes the tie down point 43, and the rear portion 44 includes the tie down point 45, all of which are positioned in the same plane.

FIGS. 1–4 illustrate embodiments of the invention where the front portions 22, 42 containing the front tie down points 23, 43, and the rear portions 24, 44 where the rear tie down points 25, 45 are located, are formed as extensions or tabs projecting longitudinally from the main body 21, 41 of the mounting bracket 20, 40. The extensions or tabs of the front tie down points are preferably oriented at an angle 48 within the range of from about 30 to about 90 degrees to the vertical, and preferably about 50 degrees to the vertical. The extensions or tabs of the rear tie down points are preferably oriented at an angle 49 within the range of from about 20 to about 70 degrees to the vertical, and preferably about 35 degrees to the vertical.

Figure 6:
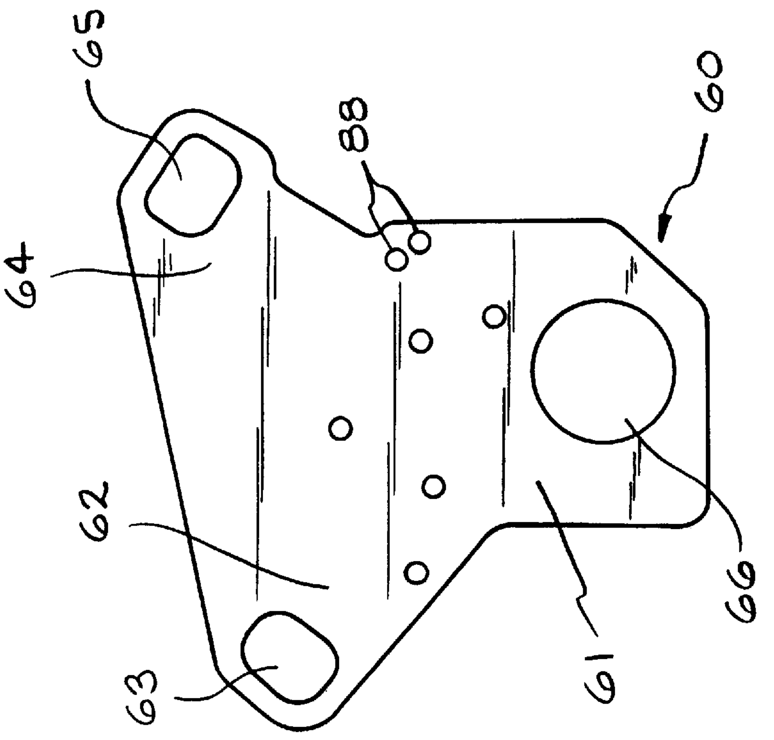
FIG. 6 illustrates a variation on the shaping of the bracket shown in FIG. 4.
Figure 5:
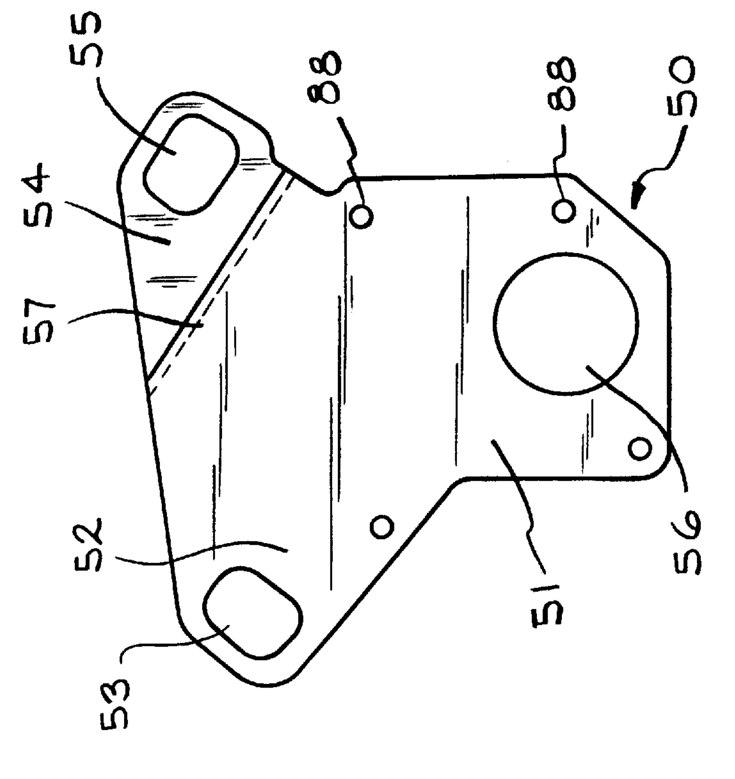
FIG. 5 illustrates a variation on the shaping of the bracket shown in FIG. 2.

FIGS. 5 and 6 illustrate variations in the shaping of brackets according to another embodiment of the present invention. FIG. 5 illustrates a bracket 50 formed with the front portion 52 and rear portion 54 being designed without being in the shape of the extensions or tabs that are shown in FIGS. 1 and 2. The main body 51 with the motor gear bore 56 and the front portion 52 containing the front tie down point 53, is formed in one plane. The rear portion 54 containing the rear tie down point 55 is in a second plane that is spaced apart from the main body 51 and the front portion 52 by an offset 57. Preferably the second plane is generally parallel to the first plane, although this does not necessarily need to be the case. Similarly, FIG. 6 illustrates a bracket 60 that is formed without the extensions or tabs containing the front tie down point 62 and the rear tie down point 64 as shown in FIGS. 1, 2, and 4. In FIG. 6, the main body 61 with the motor gear bore 66 and the front potion 62 containing the front tie down point 63 are in the same plane as the rear tie down point 65.

Figure 10:
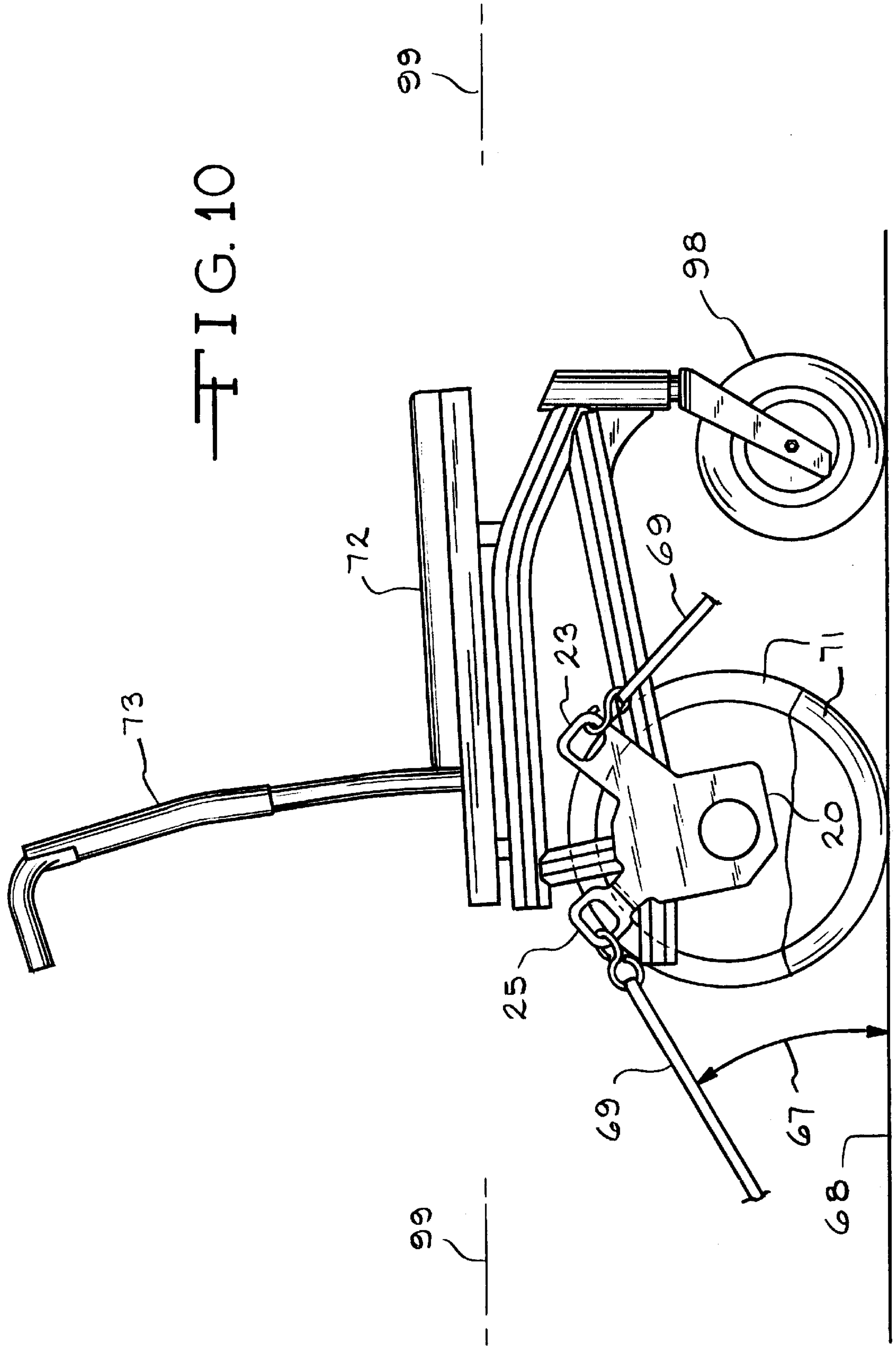
FIG. 10 shows a wheelchair that includes the bracket of the invention, with the wheelchair being tied down to a vehicle floor.

Preferably, the front tie down points 23, 33, 43, 53, and 63 and the rear tie down points 25, 45, 55, and 65 are positioned on the mounting bracket to accommodate wheelchair tie down approach angles ranging from 20° to 45° as measured from the support surface on which the wheelchair rests. As shown in FIG. 10, the tie down approach angle is the angle 67 between the floor 68 of a vehicle and the tie down straps 69.

Figure 9:
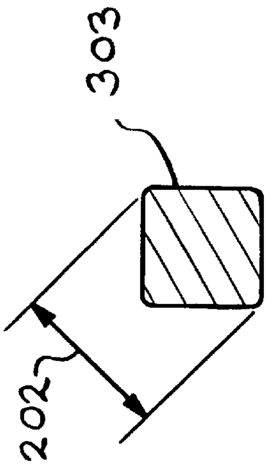
FIG. 9 is a view similar to that of FIG. 9, but having a rectangular wall construction.
Figure 8:
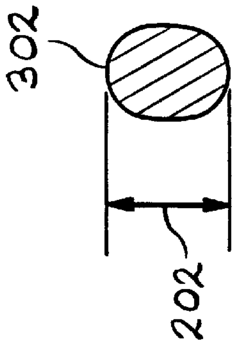
FIG. 8 is a cross-sectional view along line 8—8 of FIG. 7 illustrating minimum shaping requirements for the portion of the mounting bracket immediately adjacent the tie down opening.
Figure 7:
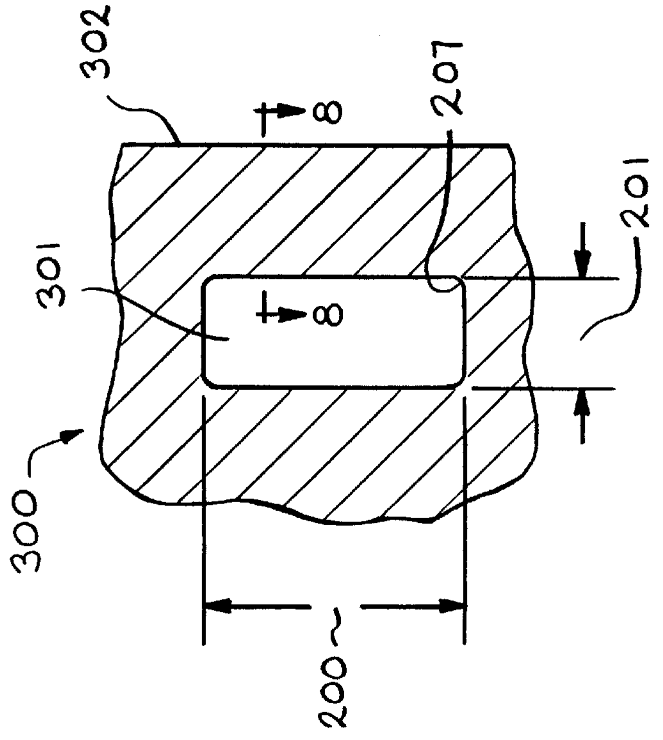
FIG. 7 is a cross-sectional view in elevation of a mounting bracket tie down point illustrating minimum shaping requirements for the tie down opening to be engaged by end fittings of strap-type tie down assemblies that are in compliance with ISO 10542.

Compatibility between a wheelchair and tie down point is essential for maximizing access, safety, and convenience. This is particularly true in public transportation where a variety of wheelchair designs must be accommodated using the same tie down system. Obviously, the time required to tie down a wheelchair is important in the efficient operation of public transportation, and the strength and security of the tie down system during a crash can determine whether the occupant of the wheelchair is protected. Annex D of ISO 10542 establishes geometric design a requirements for wheelchair tie down points intended to be engaged by the end fittings of strap-type tie down assemblies that are in compliance with the ISO 10542 standard. Accordingly, it is preferred that mounting brackets of the present invention have dimensions in accordance with the design specifications of Annex D. Such dimensions are illustrated in FIGS. 7–9. The tie down opening 301 of the mounting bracket tie down point 300, as shown in FIG. 7, generally has a minimum height 200 of 60 mm and minimum width 201 of 25 mm. The interior comers 207 of the opening 301 have a minimum radius of 5 mm to avoid sharp corners that could cut the strap.

FIG. 8 illustrates a permissible configuration of the wall portion 302 that defines the opening 301. If circular or ovoid, the longest dimension 202 of the cross section of this wall portion must be a minimum of 30 mm, with a minimum radius at the corners of 5 mm. As shown in FIG. 9, if the cross section 303 is rectangular, the minimum diagonal 203 must be 30 mm with rounded edges having a minimum radius of 5 mm. Overall, the tie down points of the mounting bracket must be positioned to accommodate wheelchair tie down approach angles within the range of from about 20° to about 45° from the support surface on which the wheelchair rests.

As shown in FIG. 10, the wheelchair 70 includes drive wheels 71, seat 72 and seat back 73. The bracket 20 of the invention, firmly mounted to the wheelchair, enables the tie down straps 69 to secure the wheelchair to the vehicle floor.

The principle and mode of operation of this invention have been described in its preferred embodiments. However, it should be noted that this invention may be practiced otherwise than as specifically illustrated and described without departing from its scope.

What is claimed is:

1. A wheelchair comprising:

a base frame having a longitudinal axis, and a forward end and a rearward end joined by a first side frame and a second side frame, each side frame being generally parallel to the longitudinal axis;

a first motor and a second motor, the first and second motors having a drive gear for rotating a drive wheel; and a first mounting bracket affixed directly to the first side frame and a second mounting bracket affixed directly to the second side frame, the first and second mounting brackets having a main body including a motor gear bore for receiving the drive gear, a front tie down point directed toward the forward end of the base frame, and a rear tie down point directed toward the rearward end of the base frame.

2. The wheelchair according to claim 1, wherein the main body, the front tie down point, and the rear tie down point are all positioned in a single plane.

3. The wheelchair according to claim 1, wherein the main body and the front tie down point are positioned in a first plane, and the rear tie down point is positioned in a second plane spaced apart from and generally parallel to the first plane.

4. The wheelchair according to claim 1, wherein the front tie down point is located on a front extension of the main body and the rear fie down point is located on a rear extension of the main body.

5. The wheelchair according to claim 1, wherein the first bracket and the second bracket are configured so that when affixed to the first and second side frames, respectively, the rear tie down point on the first bracket and the rear tie down point on the second bracket are closer to each other than the front tie down point on the first bracket and the front tie down point on the second bracket.

6. The wheelchair according to claim 1 wherein the brackets are generally vertically oriented in planes generally parallel to the longitudinal axis.

7. A wheelchair comprising:

a base frame having a longitudinal axis, and a forward end and a rearward end joined by a first side frame and a second side frame, each side frame being generally parallel to the longitudinal axis;

a first motor and a second motor, the first and second motors having a drive gear for rotating a drive wheel; and a first mounting bracket affixed directly to the first side frame and a second mounting bracket affixed directly to the second side frame, the first and second mounting brackets being generally vertically oriented in planes generally parallel to the longitudinal axis, and having a main body including a motor gear bore for receiving the drive gear, a front tie down point directed toward the forward end of the base frame, and a rear tie down point directed toward the rearward end of the base frame.

* * * * *